United States Patent [19]

DiRoss

[11] 4,259,268
[45] Mar. 31, 1981

[54] DUAL RADIATOR HEAT EXCHANGER

[76] Inventor: James DiRoss, 8002 E. Hubbell, Scottsdale, Ariz. 85257

[21] Appl. No.: 972,723

[22] Filed: Dec. 26, 1978

[51] Int. Cl.³ .................................................. F24F 13/02
[52] U.S. Cl. ...................................... 261/151; 62/310; 62/314; 62/DIG. 16; 261/153
[58] Field of Search .............. 261/151, 152, 155, 161, 261/DIG. 4, DIG. 77; 62/305, 309, 310, 314, DIG. 16

[56] References Cited

U.S. PATENT DOCUMENTS

| 2,212,356 | 8/1940 | Shure | 62/310 X |
|---|---|---|---|
| 2,214,880 | 9/1940 | Crawford | 261/161 X |
| 2,780,078 | 2/1957 | Teplitz | 62/310 |
| 3,064,952 | 11/1962 | Brown | 261/152 X |
| 3,116,612 | 1/1964 | Pennington | 62/310 X |
| 3,791,102 | 2/1974 | Huntington | 261/151 X |
| 4,054,623 | 10/1977 | Ouska | 261/151 |
| 4,112,027 | 9/1978 | Cates | 261/151 |

*Primary Examiner*—Richard L. Chiesa
*Attorney, Agent, or Firm*—Warren F. B. Lindsley

[57] ABSTRACT

An extremely simple and inexpensive heat exchanger utilizing evaporative cooling for heat removal but avoiding the entrainment of unwanted moisture in the cooled air delivered to the living area or other space being cooled.

5 Claims, 2 Drawing Figures

DUAL RADIATOR HEAT EXCHANGER

BACKGROUND OF THE INVENTION

The most common method and apparatus for reducing the temperature of living spaces and the like during the warmer months, commonly called air-conditioning methods and apparatus, involve the use of a refrigerant, means for compressing the refrigerant, means for removing heat from the compressed refrigerant, and a cooling coil into which the compressed refrigerant is expanded and vaporized. This coil is commonly called an expansion coil or refrigerating coil and the room space is cooled by blowing air across such coil and discharging the air through a duct system involving various outlets in various locations in the living space. Because of the cost of operating this type of refrigerating system, it is the common practice to re-circulate most if not all of the room air, so that precautions must be taken to avoid building up to excessive moisture in the air system. Moisture is normally removed by cooling the air at the refrigerating coil to the dew point or below and removing the resulting condensate.

In regions of low relative humidity the low wet bulb temperature such as the southwestern part of the United States, so-called evaporative coolers have gone into rather extensive use. For the most part evaporative coolers provide for no re-circulation of air whatsoever, the outside relatively dry air being brought in at a relatively high rate of speed and passed through moist pads to thereby cool the air adiabatically; that is to say, to reduce the sensible heat as shown by the dry bulb thermometer and increase the latent heat as shown by the wet bulb thermometer. The sensibly cooler air that has entered the living area replaces the room air which is vented through slightly open windows or doors in various parts of the house to provide uniform distribution of replacement air. There are many advantages in the use of evaporative cooling, particularly in intial cost, since the system is simple and requires no appreciable duct work and no returns. The actual operating costs are low because the water and power required to operate an evaporative cooler together cost much less than the power required to operate a refrigeration system.

Evaporative coolers are known to have certain disadvantages and limitations. For one thing, there is no reduction of total heat and there are circumstances under which this fact becomes discernible. The evaporative cooler also introduces amounts of additional moisture into the air but no build-up of moisture such as caused by re-circulation. There are times when the actual moisture in the system introduced by evaporative cooling may be too great for comfort, particularly during periods of relatively high humidity such as is encountered at certain times even in the most arid areas. There may be only a very few days in arid areas where the moisture of the air will be high enough to bring discomfort, but in borderline areas the total percentage of time during which unduly high humidities will be encountered may be great enough to make the use of straight evaporative systems undesirable or impractical.

In addition, persons suffering from allergies to pollens and molds are adversely affected by the constant introduction of outside air. Very often the development of molds in the evaporative cooler itself further aggravates the problem.

Nevertheless, in the current period of rising energy costs and fuel shortages it is highly desirable that every advantage possible should be realized from the inherent efficiency of the evaporative cooling approach.

What is needed, therefore, is a simple, effective, efficient and inexpensive cooling or air-conditioning system based on the principles of the evaporative cooler but avoiding the stated disadvantages thereof.

DESCRIPTION OF THE PRIOR ART

Various types of air-conditioning systems are described in the prior art which utilize evaporative cooling in different ways to achieve certain of the goals of the present invention.

R. B. P. Crawford, in U.S. Pat. No. 2,214,880 describes a regenerative cooling system in which the inlet air passes first through a chemical de-humidifier, then through cooling coils, and thence into the room being cooled. Water circulated in the cooling coils passes to a cooling tower where it is discharged through a nozzle as a spray, is cooled by evaporation through the effects of a counter-flowing air stream, and is then collected for re-circulation through the cooling coils. While this system might well accomplish the functional goals of the present invention, it is undesirably complex and expensive.

A second relatively complex and expensive air-conditioning system incorporating an evaporative cooling means as one element of the system is described by S. J. Shure in U.S. Pat. No. 2,212,356. The evaporative cooling means is employed in conjunction with a conventional refrigeration system. In this case evaporative cooling of the condenser is employed to achieve improved efficiency through the redirection of energy utilization. Unfortunately, the system is again relatively complex and expensive.

A less expensive air-conditioning system utilizing evaporative cooling in a manner partially meeting the goals of the present invention is described by N. A. Pennington in U.S. Pat. No. 3,116,612. Pennington's system utilizes two evaporative cooling stages. The first is utilized to cool the water being circulated in cooling coils through which the inlet air is passed and the second provides direct evaporative cooling of the air as it is exhausted into the room being cooled. The first stage of cooling involving the water-circulating cooling coils reduces the total heat content of the conditioned air with the result that the amount of moisture introduced by the second stage evaporative cooler may be somewhat reduced.

An approach somewhat more closely allied with the present invention is described by A. Teplitz in U.S. Pat. No. 2,780,078. Teplitz utilizes water-circulating cooling coils through which the inlet air is passed. The water from the cooling coils is circulated through an open tank or reservoir. Mounted above the reservoir is a porous belt suspended from a pulley. The revolving pulley causes the belt to be rotated with its lower extremity extending into the water held by the reservoir. The belt picks up water from the reservoir which is cooled by partial evaporation which is aided by an air stream supplied by a motor-driven fan. The cooled water returned to the reservoir by the belt cools the water circulated in the cooling coils. This system is relatively simple and inexpensive and it achieves the objectives of reducing the heat content of the conditioned air without the introduction of additional moisture from the evaporative cooler. It is nevertheless deficient in terms of maintainability. The open tank through which the circulating water is passed is vulnerable to the introduction of bacteria, dust etc. which can restrict or block the circulating coils. Furthermore, the rotating belt is subject to wear and will require frequent replacement.

SUMMARY OF THE INVENTION

In accordance with the invention claimed, an improved evaporative cooling system is provided which incorporates dual heat exchangers to avoid the entrainment of moisture in the air supplied to the living areas being cooled.

It is, therefore, one object of the present invention to provide an improved cooling system for a dwelling or other enclosure.

Another object of the invention is to provide a cooling system which is highly efficient in terms of energy utilization.

A further object of this invention is to provide a cooling system which is simple and inexpensive in terms of its initial cost.

A still further object of this invention is to provide a cooling system which utilizes a minimum number of moving parts and which is readily maintainable through a long operating life.

A still further object of this invention is to provide a cooling system which avails itself of the operating efficiency inherent in an evaporative cooling system while avoiding its primary disadvantage, namely the entrainment of moisture ordinarily characterizing such systems.

Yet another object of this invention is to provide a cooling system utilizing an evaporative cooling means in a manner which permits recirculation of the conditioned air.

Additional objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
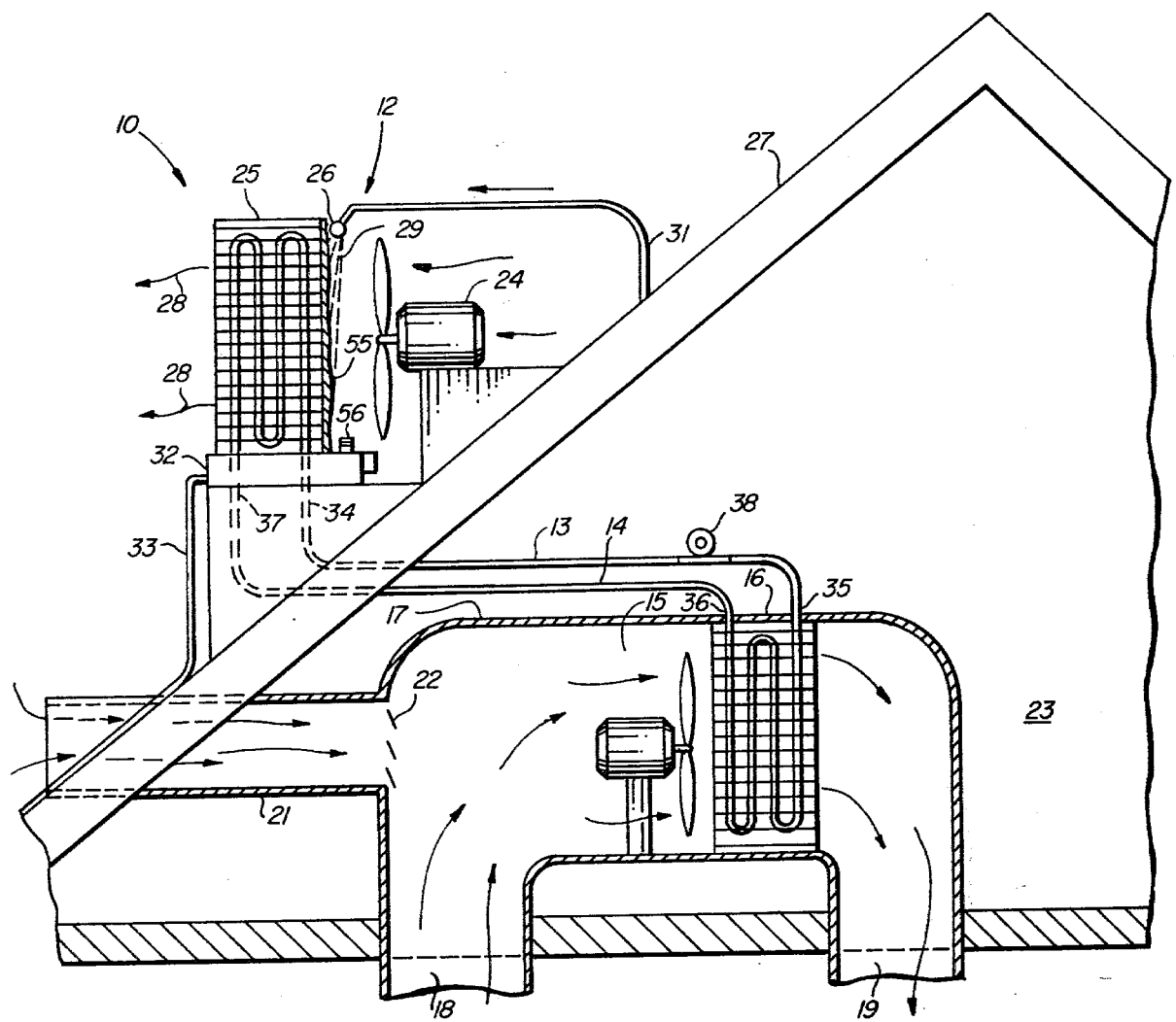
FIG. 1 is a functional diagram showing a typical installation of the cooling system of the invention in a home or other building.

Referring more particularly to the drawing by characters of reference, FIG. 1 discloses the improved cooling system 10 of the invention comprising a first heat exchanger unit 11 and a second heat exchanger unit 12 interconnected by water lines 13 and 14.

Heat exchanger unit 11 comprises a blower 15 and a radiator 16 serially positioned in an air passage or plenum 17. The blower 15 may be any form of motor-driven fan and the radiator 16 may be a structure of finned tubes, passageways, or the like, through which air may be passed for the removal of heat from a liquid circulated through the tubes.

The plenum 17 has at least an inlet port 18 and an outlet port 19 for receiving and returning air, respectively, from the dwelling or other enclosure which it is intended to cool. A fresh-air inlet port 21 incorporating an air valve or adjustable damper 22 may also be provided.

Heat exchanger unit 11 might conveniently be mounted in an attic 23 as shown in FIG. 1.

Heat exchanger unit 12 comprises a second blower 24, a second radiator 25 and a spray head 26. Blower 24 is again some form of motor-driven fan and radiator 25 has a structure similar to that of radiator 16 except that its fins and other exposed exterior surfaces are preferably coated with teflon or other protective materials which prevent oxidation or scale build-up.

Blower 24 and radiator 25 are preferably mounted out-of-doors, typically on the roof 27 of the cooled structure. The blower 24 is positioned to produce a draft of air 28 which will pass through radiator 25 and be discharged into the atmosphere. The spray head 26 directs a mist of atomized water 29 toward and over the side of radiator 25 at which the air 28 enters so that the dispensed moisture is caused to cover and wet the radiating surfaces. Head 26 is supplied by a water line 31 which is connected from a source of water which is preferably softened or otherwise treated to remove minerals and other impurities which might otherwise produce a scale buildup on the surfaces of radiator 25. A sump 32 is provided at the base of radiator 25 for the collection of excess water originating from head 26, and an overflow hose 33 carries water from sump 32 to waste.

In the operation of the cooling system 10 the tubes or passageways or radiators 16 and 25 are filled with water. The water inlet port 34 of radiator 25 is connected to the water outlet port 35 of radiator 16 by water line 13, and the water inlet port 36 of radiator 16 is connected to the water outlet port 37 of radiator 25 so that a closed circulating water system is formed. Air blown through radiator 25 over its wetted radiating surfaces promotes the evaporation of the surface moisture, and the evaporation of moisture from these surfaces cools the water contained in the internal tubes and passageways. As the water inside radiator 25 is cooled in this manner a natural circulation of water is induced in the closed circulating water system described above whereby the cooled water from radiator 25 passes downward through line 14 into radiator 16, and warmer water from radiator 16 flows upward through line 13 into radiator 25. At the same time, air blown through radiator 16 by blower 15 is cooled by virtue of heat transfer from the warm air delivered by blower 15 to the cooled water circulating in radiator 16. The heat thus added to the water further promotes the circulation of water in the closed circulating system between radiators 16 and 25.

In summary, the flow of heat is from the warm inlet air 18 to the water circulating in radiator 16. The heat collected in radiator 16 is carried by circulating water to radiator 25 where it is extracted by evaporation and discharged to the atmosphere. It is thus seen that the system 10 has selectively utilized the beneficial aspects of evaporative cooling while rejecting its disadvantages; the evaporative heat exchanger unit 12 efficiently extracts heat from the system while unit 11 provides a transfer link to the cooled air of the dwelling which avoids any introduction or entrainment of additional moisture.

It will be recognized that the natural circulation of water between radiators 16 and 25 is dependent upon a number of factors including the elevated position of radiator 25 relative to radiator 16 and the flow resistance offered by the internal water passages and the lines 13 and 14. Where the natural circulation under the effects of these parameters is inadequate, it will be necessary to provide a water pump 38 connected in series with line 13 or line 14. The pump 38 will then provide the needed water circulation between radiators 16 and 25 and it can be selected or controlled to supply such circulation at the desired rate.

Figure 2:
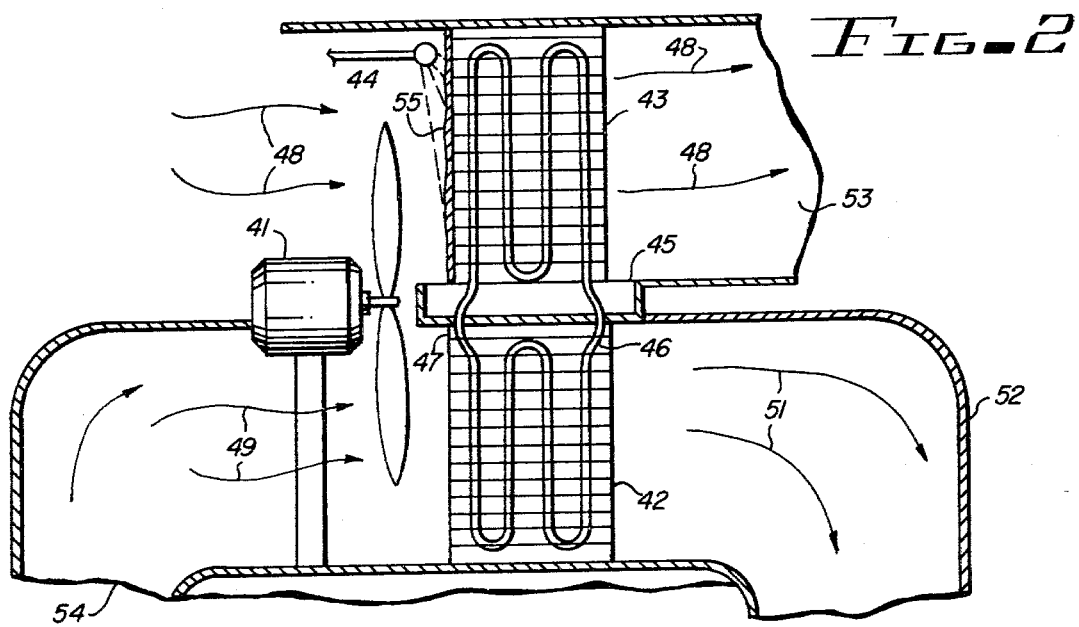
FIG. 2 is a simplified second embodiment of the cooling system of the invention assembled as a free-standing unit.

A free-standing cooling unit 40 is shown in FIG. 2 as a second embodiment of the invention. The unit 40 incorporates in a single structure a single blower 41, a lower radiator 42, and an upper radiator 43. The upper radiator 43 is mounted directly over the lower radiator 42 and the blower 41 is positioned to blow air through both radiators 42 and 43 simultaneously. A spray head 44 is provided to wet the surfaces of radiator 43 and a sump 45 is provided at the base of radiator 43 to collect excess water from head 44. As in the case of unit 12, water is delivered to head 44 from a soft water source and a hose (not shown) carries excess water to waste from sump 45. A short water line 46 connects the water inlet of radiator 43 to the outlet of radiator 42, and a line 47 connects the outlet of radiator 43 to the inlet of radiator 42. Air 48 from blower 41 passing over the wetted surfaces of radiator 43 evaporatively cools the water circulating in radiator 43. Cooled water from radiator 43 circulates through lines 46 and 47 and through radiator 42 where it collects heat from air 49 supplied by blower 41 to radiator 42. Cooled air 51 from radiator 42 is delivered through air ducts 52 to the dwelling or other structure being cooled.

It may be found that radiators 42 and 43 can be constructed economically as a single unit with appropriately routed internal water passages.

Through the physical partitioning of the evaporative cooling stage involving radiator 43 from the liquid-to-air heat exchange involving radiator 42, the efficiency of evaporative cooling is again utilized while avoiding moisture entrainment in the cooled air. Furthermore, an extremely simple and inexpensive structure is realized.

While the structure of unit 40 as shown in FIG. 2 does not readily lend itself to the recirculation of the air from the dwelling or other enclosure being cooled, ducting arrangements 53 and 54 to effect exhaust to atmosphere of the moisture laden air and at least partial recirculation of the cooled relatively dry air are contemplated as falling within the scope of this invention. It should be noted that in FIGS. 1 and 2, a closed system of a given amount of recirculating water is used with fresh or additional water added to the interconnected coil system only when needed.

It should be noted that a pad 55 of the fibrous material of the type used in the known evaporative coolers may be used to receive the water from heads 26 and 44, if so desired. If desired, a motor driven wheel 56 shown in FIG. 1 and formed to scoop water up and centrifugally throw it in front of the coils of the radiator 25 may be used in place of the spray head 26. Further, the blowers 15 and 24 of FIG. 1 comprising air moving means may be operated simultaneously or independently of each other.

An improved cooling system for a dwelling or other enclosure, such as an automobile, is thus provided in accordance with the stated objects of the invention. An automobile such as a Volkswagen can utilize the structure shown in FIG. 1 by mounting the second radiator 25 and its spray cooling means under the car with radiator 16 and its associated hardware mounted in the car.

Although but a few embodiments of the invention have been illustrated and described, it will be apparent to those skilled in the art that various changes and modifications may be made therein without departing from the spirit of the invention or from the scope of the appended claims.

What is claimed is:

1. An air conditioning apparatus comprising:
   coil means comprising interconnected first and second coil portions,
   said first and second coil portions being substantially filled with recirculatable water,
   said coil means being mounted with said first coil portion above said second portion,
   a cooling means mounted on a given side of said first portion for water bearing air movement across the coils of said first coil portion,
   blower means for directing only atmospheric air through said cooling means and over the coils of said first coil portion and back to the atmosphere for cooling the water flowing through the coils of said first coil portion,
   duct means for interconnecting a space to be air conditioned with said second coil portion,
   said blower means continuously withdrawing a quantity of air from a space being air conditioned and directing said withdrawn air over the coils of said second coil portion for cooling purposes and recirculation to said space,
   the water cooled in said first coil portion by said cooling means circulating through the coils of said second coil portion and cooling said withdrawn quantity of air passing over the coils of said second coil portion.

2. The air conditioning apparatus set forth in claim 1 in further combination with:
   a pump means connected to said coil means for recirculating water through said coil means.

3. The air conditioning apparatus set forth in claim 1 wherein:
   said first coil portion is spacedly positioned from said second coil portion for mounting on a roof of a building and said second coil portion being mounted within the building.

4. The air conditioning apparatus set forth in claim 1 in further combination with:
   chamber means for housing said first and second coil portions in a vertical juxtapositioned arrangement.

5. The air conditioning apparatus set forth in claim 4 wherein:
   said blower means comprises a single air moving means for directing air simultaneously over the coils of both said first and second coil portions.

* * * * *